US012749472B2

(12) United States Patent
Singh et al.

(10) Patent No.: US 12,749,472 B2
(45) Date of Patent: Sep. 29, 2026

(54) ADDITIVE MANUFACTURING OF RESONANT METASURFACES FOR NOISE CANCELLATION

(71) Applicant: Dell Products L.P., Round Rock, TX (US)

(72) Inventors: Tejinder Singh, Kanata (CA); Navjot Kaur Khaira, Kanata (CA); Kan Wang, Ottawa (CA)

(73) Assignee: DELL PRODUCTS L.P., Round Rock, TX (US)

( * ) Notice: Subject to any disclaimer, the term of this patent is extended or adjusted under 35 U.S.C. 154(b) by 266 days.

(21) Appl. No.: 18/539,362

(22) Filed: Dec. 14, 2023

(65) Prior Publication Data

US 2025/0201225 A1 Jun. 19, 2025

(51) Int. Cl.

*G10K 11/172* (2006.01)
*B33Y 80/00* (2015.01)
*G10K 11/162* (2006.01)

(52) U.S. Cl.

CPC .......... *G10K 11/172* (2013.01); *G10K 11/162* (2013.01); *B33Y 80/00* (2014.12)

(58) Field of Classification Search

CPC ..... G10K 11/172; G10K 11/162; B33Y 80/00
USPC .......................................................... 181/284
See application file for complete search history.

(56) References Cited

U.S. PATENT DOCUMENTS 1,554,179 A 9/1925 Sewall
5,457,291 A * 10/1995 Richardson .......... G10K 11/172 181/294
7,789,196 B2 9/2010 Fukuhara et al.
8,485,310 B2 7/2013 Tanabe et al.
8,857,563 B1 10/2014 Chang et al.
8,869,933 B1 10/2014 McKnight et al.

(Continued)

OTHER PUBLICATIONS

Kumar, et al. , "The present and future role of acoustic metamaterials for architectural and urban noise mitigations," Acoustics, vol. 1, No. 3, pp. 590-607, Published: Aug. 1, 2019. doi:10.3390/acoustics1030035.

(Continued)

*Primary Examiner* — Forrest M Phillips

(74) *Attorney, Agent, or Firm* — Amin, Turocy & Watson, LLP

(57) ABSTRACT

The technology described herein is directed towards metasurfaces arranged with unit cells for narrowband sound absorption, in which the unit cells are based on the principles of Helmholtz resonators. A deeply subwavelength sound absorbing unit-cell is designed and constructed based on a desired resonance frequency. The unit-cell includes a neck portion and air chamber dimensioned to resonate at the desired resonance frequency to inverse phase cancel corresponding narrowband frequencies of incoming sound waves. The unit cells are distributed (e.g., periodically) as part of a metasurface, e.g., positioned proximate to a noise source. As practical examples, the metasurface or multiple metasurfaces can be placed near or wrapped around a computer server or rack of servers to absorb fan noise. The metasurface components (including the unit-cells) can be manufactured using any type of additive manufacturing process such as 3D printing to result in a thin, light-weight, and cost effective noise absorbing metasurface.

20 Claims, 9 Drawing Sheets

(56) References Cited

U.S. PATENT DOCUMENTS

| | | | | |
|---|---|---|---|---|
| 9,343,059 | B2 * | 5/2016 | Wilson | G10K 11/172 |
| 9,767,783 | B2 * | 9/2017 | Ishida | G03G 21/00 |
| 11,168,474 | B2 * | 11/2021 | Koga | B32B 27/08 |
| 11,555,280 | B2 * | 1/2023 | Su | E01F 8/0047 |
| 11,862,136 | B2 * | 1/2024 | Huang | G10K 11/168 |
| 11,929,053 | B2 | 3/2024 | Guo et al. | |
| 12,270,165 | B2 * | 4/2025 | Dirnberger | E01F 8/0017 |
| 2010/0078258 | A1 | 4/2010 | Tanabe et al. | |
| 2013/0087407 | A1 | 4/2013 | McKnight et al. | |
| 2019/0168445 | A1 * | 6/2019 | Jara Rodelgo | H10N 30/077 |
| 2019/0295521 | A1 | 9/2019 | Hakuta | |
| 2022/0366886 | A1 * | 11/2022 | Winkler | G10K 11/162 |
| 2022/0389939 | A1 | 12/2022 | Hakuta et al. | |
| 2024/0190102 | A1 * | 6/2024 | Alter | G10K 11/172 |

OTHER PUBLICATIONS

Nguyen, "Development of acoustic metamaterials for Efficient Sound Control Noise Mitigation," Jul. 2021, doi:10.32469/10355/88138.

Naify, "Noise control using lightweight acoustic metamaterials," Jun. 2, 2013, Proc. Mtgs. Acoust. 19, 065017, doi:10.1121/1.4799723.

Zhang, et al.,, "Coiled-up structure with porous material lining for enhanced sound absorption," International Journal of Mechanical Sciences, vol. 256, Oct. 15, 2023, 108480. doi: 10.1016/j.ijmecsci.2023.108480.

Li, et al., "Multiscale porous with coiled-up channel for lowfrequency broadband sound absorption," International Journal of Mechanical Sciences, vol. 232, p. 107622, 2022. doi: 10.1016/j.ijmecsci.2022.107622.

Wang, et al., "Broadband low-frequency sound absorption by coiled-up space embedded in a porous layer," Applied Acoustics, vol. 182, p. 108226, 2021. doi:10.1016/j.apacoust.2021.108226.

Yin, et al., "A review of electromagnetic shielding fabric, wave-absorbing fabric and wave-transparent fabric," Polymers, vol. 14, No. 3, p. 377, Published: Jan. 19, 2022. doi:10.3390/polym14030377.

Assouar, et al., "Acoustic metamaterials for sound mitigation," Comptes Rendus Physique, vol. 17, No. 5, pp. 524-532, 2016. doi:10.1016/j.crhy.2016.02.002.

Kumar, et al., "Ventilated acoustic metamaterial window panels for simultaneous noise shielding and air circulation," Applied Acoustics, vol. 159, p. 107088, 2020. doi:10.1016/j.apacoust.2019.107088.

canadasafetycouncil.org, "Office noise and acoustics," Canada Safety Council, https://canadasafetycouncil.org/office-noise-and-acoustics/, (accessed Sep. 27, 2023).

Casarani et al., "3D Printed Small-scale Acoustic Metamaterials Based on Helmholtz Resonators with Tuned Over-tones", IEEE Sensors, DOI: 10.1109/ICSENS.2017.8234381, 2017, 3 pages.

Euve et al., "Time Domain Modelling of a Helmholtz Resonator Analogue for Water Waves", Journal Fluid Mechanics, vol. 920, A22, 2021, 27 pages.

Vandegrift, Guy, "Experimental Study of the Helmholtz Resonance of a Violin", American Journal of Physics, vol. 61, Issue No. 5, May 1993, pp. 415-421.

Fletcher, N. H., "Acoustic Systems in Biology", Oxford University Press, Jul. 23, 1992.

Singh et al. "Multiband and Broadband Sound Absorbing Metamaterials for Noise Cancellation" U.S. Appl. No. 18/734,408, filed Jun. 5, 2024, 41 pages.

Non-Final Office Action received for U.S. Appl. No. 18/734,408 dated May 14, 2026, 12 pages.

* cited by examiner

ADDITIVE MANUFACTURING OF RESONANT METASURFACES FOR NOISE CANCELLATION

BACKGROUND

Acoustic absorbers are specialized materials or structures designed to mitigate the effects of sound reflections, echoes, and reverberations in various environments. These absorbers function by capturing sound waves and converting their energy into heat, effectively reducing the intensity of the sound waves and preventing them from bouncing off surfaces and causing unwanted sound reflections. They are typically engineered using porous materials with intricate structures that allow sound waves to penetrate deep into the material, where the acoustic energy is dissipated as thermal energy through friction and air resistance.

Existing acoustic absorbers come in various forms, including foam panels, fabric-wrapped panels, diffusers, bass traps, and more. One of the problems with existing acoustic absorbers is that they are not desirable in certain heat-sensitive environments. For example, servers generate a lot of heat and thus are designed with fans to cool and dissipate the heat; however, fans can generate a lot of annoying noise. Using existing acoustic absorbers to absorb server noise reduces the noise but can significantly reduce dissipation of the heat generated by servers, which can result in high heat levels that can reduce server performance and possibly cause a server to shut down to avoid damage from overheating.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1A:
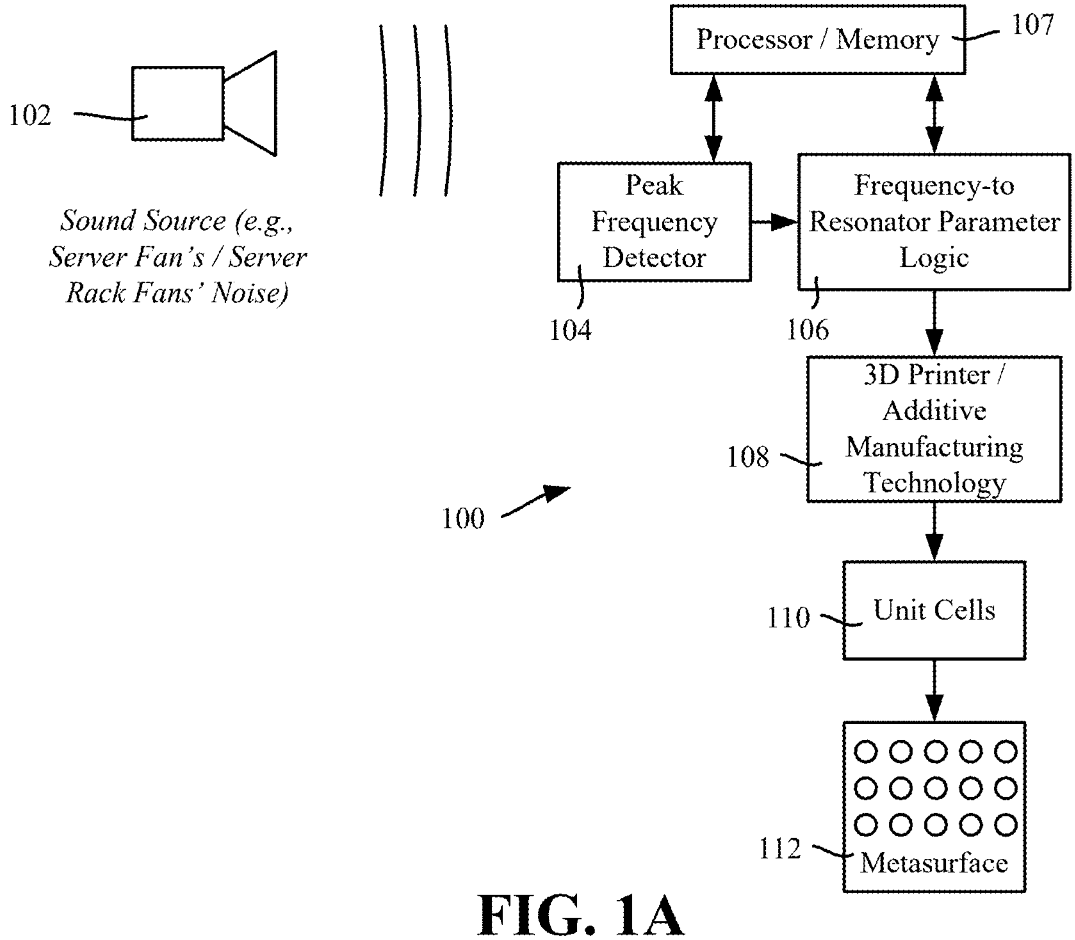
FIG. 1A is a block diagram showing an example system for implementing a metasurface with resonating unit cells for noise cancellation by phase canceling a narrowband frequency in acoustic waves, in accordance with various aspects and implementations of the subject disclosure.

Various aspects of the technology described herein are generally directed towards a sound absorbing device based on inverted phase cancellation, and more particularly towards an acoustic absorbing metasurface based on the principles of Helmholtz resonators. The technology described herein facilitates the design and implementation of unit cells into metasurfaces that can be configured and positioned to efficiently absorb and dissipate sound waves of a specific frequency. Significantly, the use of metasurfaces as described herein do not increase the heat levels of computing devices substantially compared to existing technologies for sound absorption that do not facilitate ventilation/do not dissipate the heat very well. The specific frequency can be of any frequency/narrowband frequency range over a broad range of audible frequencies, or even subsonic (below 20 Hz)/supersonic frequencies (up to about 20,000 Hz).

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimize," "optimization," "optimal," "optimally" and the like only represent objectives to move towards a more optimal state, rather than necessarily obtaining ideal results. For example, "optimal" placement of a subnet means selecting a more optimal subnet over another option, rather than necessarily achieving an optimal result. Similarly, "maximize" means moving towards a maximal state (e.g., up to some processing capacity limit), not necessarily achieving such a state.

Further, it is to be understood that the present disclosure will be described in terms of a given illustrative architecture; however, other architectures, structures, substrate materials and process features, and steps can be varied within the scope of the present disclosure.

It will also be understood that when an element such as a layer, region or substrate is referred to as being "on" or "over" another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

FIG. 1A shows a generalized block diagram of an example system 100 including a sound source 102 such as server fan/fans of a rack of servers that generate undesirable noise including at a frequency that is to be absorbed based on the technology described herein. A frequency measurement tool can be used as a peak frequency detector 104 or the like to determine which frequency to cancel as described herein. As will be seen, the frequency itself is absorbed extremely efficiently by the technology described herein, with a narrow band of nearby frequencies also reduced to a lesser, but still desirable, extent.

Once the frequency to cancel is determined, frequency-to-resonator parameter logic 106 can be used to determine the parameters of unit cells that can inverse phase cancel that frequency. The peak frequency detector 104 and/or the frequency-to-resonator parameter logic 106 can incorporate or be coupled to suitable processor/memory component(s) 107. The logic can be 106 used to directly or indirectly control additive manufacturing technology/a 3D printer 108 to produce the unit cells 110, as well as a metasurface 112 including the unit cells.

The unit cells 110 are based on the principles of Helmholtz resonators, which are acoustic cavities with a small neck port or opening that are highly effective at absorbing specific frequencies via resonance. For example, the resonant frequency ($f_{resonance}$) of a classical Helmholtz resonator with respect to frequencies in the audible range is determined by the speed of sound (v), the unit cell's cavity chamber's volume (V), and by the length (L) and area (A) of the unit cell's neck port:

$$f_{resonance} = \frac{v}{2\pi}\sqrt{\frac{A}{VL}}$$

Figure 1B:
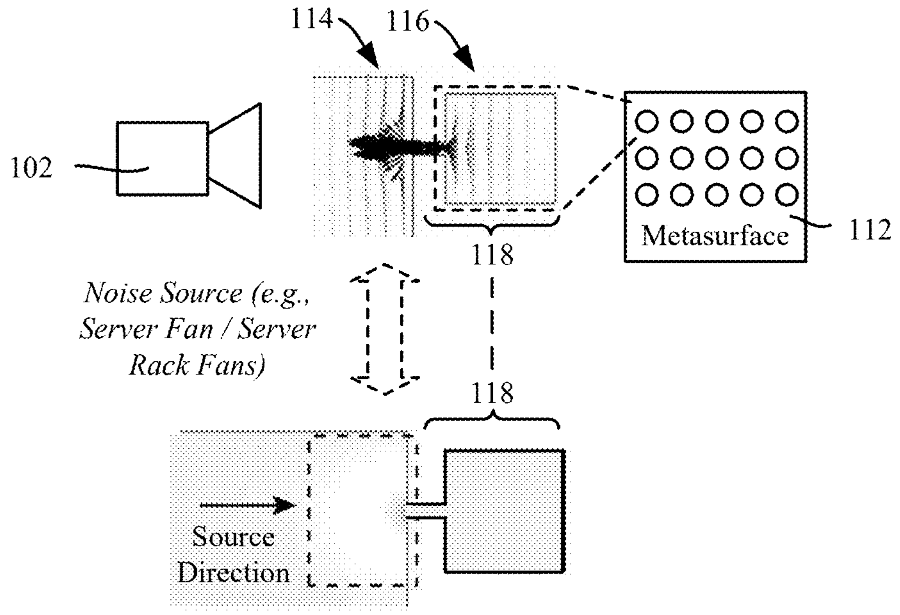
FIG. 1B is a representation of an example metasurface deployed for noise cancellation, in accordance with various aspects and implementations of the subject disclosure.

The unit cells 110, each represented as a small circle in FIGS. 1A and 1B, are incorporated into the metasurface 112, which can then be positioned to cancel the noise source at the determined frequency. In one implementation, the metasurface 112 contains an array of the unit cell resonator units arranged in a two-dimensional pattern. For absorbing a server's fan noise, for example, the metasurface 112 can be positioned proximate to the server's location, or even wrapped around at least part of the server's housing. The same metasurface noise-cancellation concept can be extended to a rack of servers via appropriately-sized (e.g., larger) and/or more metasurfaces.

As generally represented in FIG. 1B, when incident sound waves (block 114) interact with the metasurface 112, the Helmholtz resonators within the array selectively absorb the corresponding frequencies via inverse phase cancellation (represented by the scattering air velocity vectors in blocks 114 and 116). As sound waves enter the resonators (e.g., the resonator 118) through the neck port, they create pressure fluctuations within the cavities. By engineering the geometrical parameters of the cavity/air chamber, the resulting resonance frequency of the unit cell creates a n phase shift reflected wave with respect to the incident wave as shown in FIG. 1B, where the two sets of waves with opposite phase cancel, effectively absorbing the frequency. This is highlighted via the air velocity vector plot showing the direction of the reflected wave with π phase shift in the upper portion of FIG. 1B. In addition, these pressure fluctuations also cause the air inside the cavities to oscillate, effectively converting acoustic energy into kinetic energy. This kinetic energy is then dissipated as heat through viscous losses in the narrow neck of the resonators, however the heat dissipation is appreciably better relative to traditional sound absorbers and does not significantly affect thermal performance of a server.

Figure 2A:
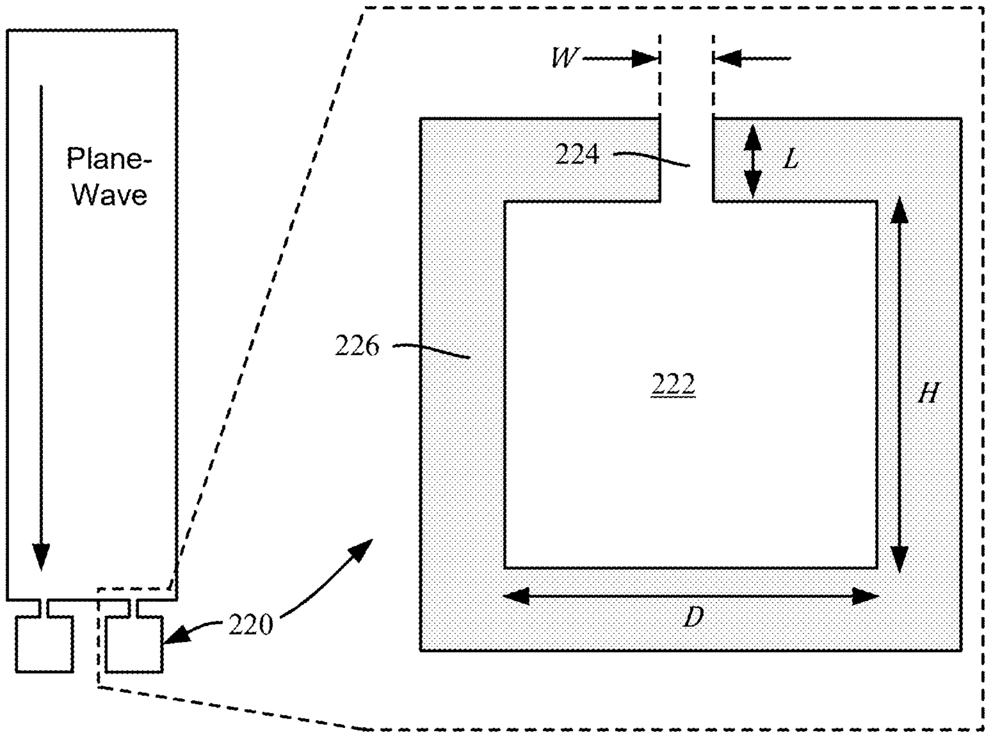
FIG. 2A is a two-dimensional side view representation of example unit-cells including one enlarged unit cell showing various dimensions that determine the unit cell's resonance frequency, in accordance with various aspects and implementations of the subject disclosure.

As generally represented in FIG. 2A, each unit cell comprises a cavity, or air chamber 222, often with a neck port 224 that exposes the air chamber to the air/incoming sound waves, with dimensions engineered to target a particular frequency or a narrowband range of frequencies of interest. The dimensions of the air chamber 222 and neck port 224 are designed based on the desired acoustic frequencies, allowing the unit cells of the metasurface 112 to resonate when exposed to sound waves of those frequencies. When constructed, the air chamber 222 and neck port 224, which are hollow to contain air, are enclosed in a supporting structure 226 through which the neck port 224 extends to couple the chamber to the air propagating the sound wave.

FIG. 2A illustrates the unit cell's variable dimensions including the chamber height (H), and in the example of a cylindrical air chamber, the chamber's diameter (D) which is twice the radius, such that a cylindrical air chamber's volume is:

$$V = \left(\pi \times \frac{1}{2}D\right)^2 \times H.$$

The neck port, which is also a cylindrical tube in this example, has an area of $$\left(\pi \times \frac{1}{2}W\right)^2$$

and a length of L. The unit cell is not limited to cylindrical air chambers or cylindrical necks, but can be of any suitable shape that facilitates resonating at the desired frequency in a manner that phase cancels the incoming sound wave of that frequency.

Figure 2B:
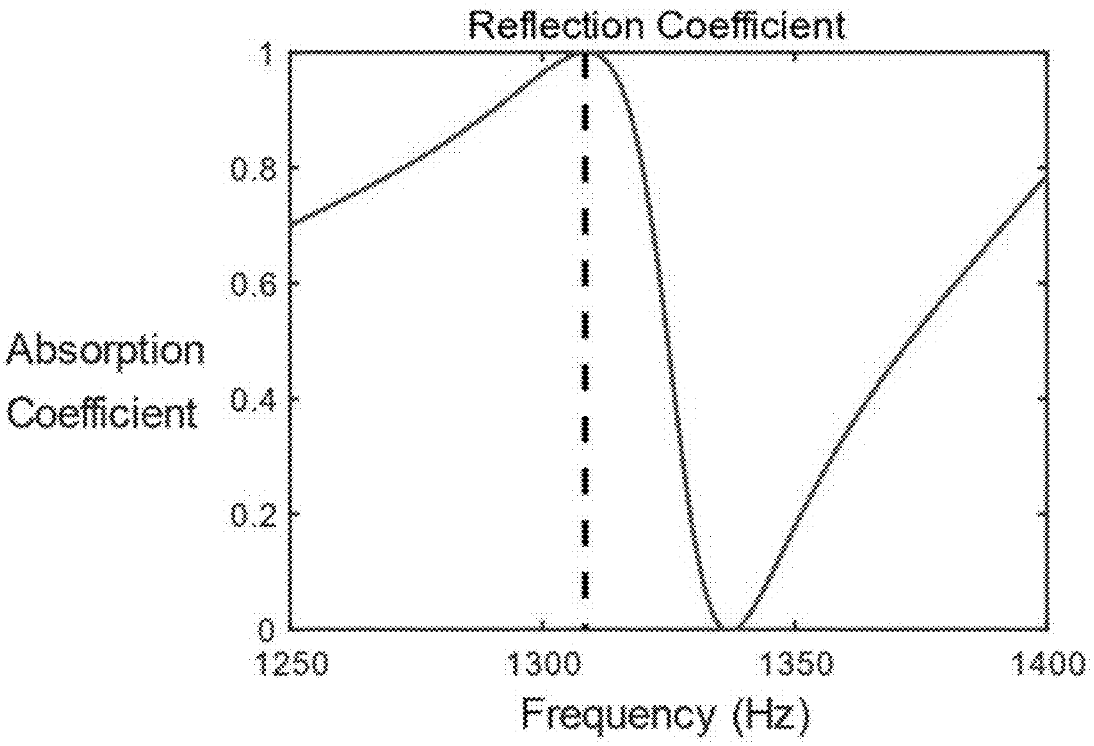
FIG. 2B is a graphical representation of resulting absorption coefficient values of the unit-cell(s) of FIG. 2A over a range of frequencies, including a very high absorption coefficient value at the designed frequency 1310 Hz, in accordance with various aspects and implementations of the subject disclosure.

The result is highly efficient sound absorption at specific frequencies as shown in FIG. 2B, which in this example is around 1310 Hz, making this metasurface particularly useful for targeted noise reduction in environments where controlling specific frequencies is beneficial, such as in architectural acoustics, automotive design, and industrial settings. The dimensions are deep subwavelength values relative to the subwavelength of the incoming wave. For example, one metasurface implementation was designed to inverse phase cancel an incoming frequency 1310 Hz, with selected unit-cell dimensions of D=18 mm, H=16 mm, L=6 mm, W=3.2 mm. The resulting absorption coefficient of the designed unit-cell achieved near-perfect (greater than 98 percent absorption at the designed frequency 1310 Hz), as shown in FIG. 2B. As can be seen from this example, the structure is deeply sub-wavelength; the wavelength λ at 1310 Hz in air is 260 mm, which is controlled by unit-cell with thickness of 22 mm. As can be seen, the above-selected dimensions of D, H, L and W for 1310 hertz (λ=260 m) in air range from about λ/14 to λ/81 (or λ/13 if based on the thickness of 22 mm). Note that while the curve of FIG. 2B shows about seventy percent absorption effectiveness around 1250 Hz increasing to the peak absorption at the desired frequency 1310 Hz, the curve can be flattened more around the designed frequency to an extent, e.g., by slightly tweaking the dimensions of some of the unit cells.

The designed unit-cell only needs air and its surrounding acoustic hard boundaries. This is different from other approaches using porous and fibrous materials and gradient index materials. At this scale the unit-cell acts almost like a point towards the wave, so this design is not straightforward. However, the materials and the compact design in mm-scale/deeply sub-wavelength facilitate fabricating the unit cell as a thin, light-weight, and cost effective absorber with additive manufacturing technology.

Figure 3:
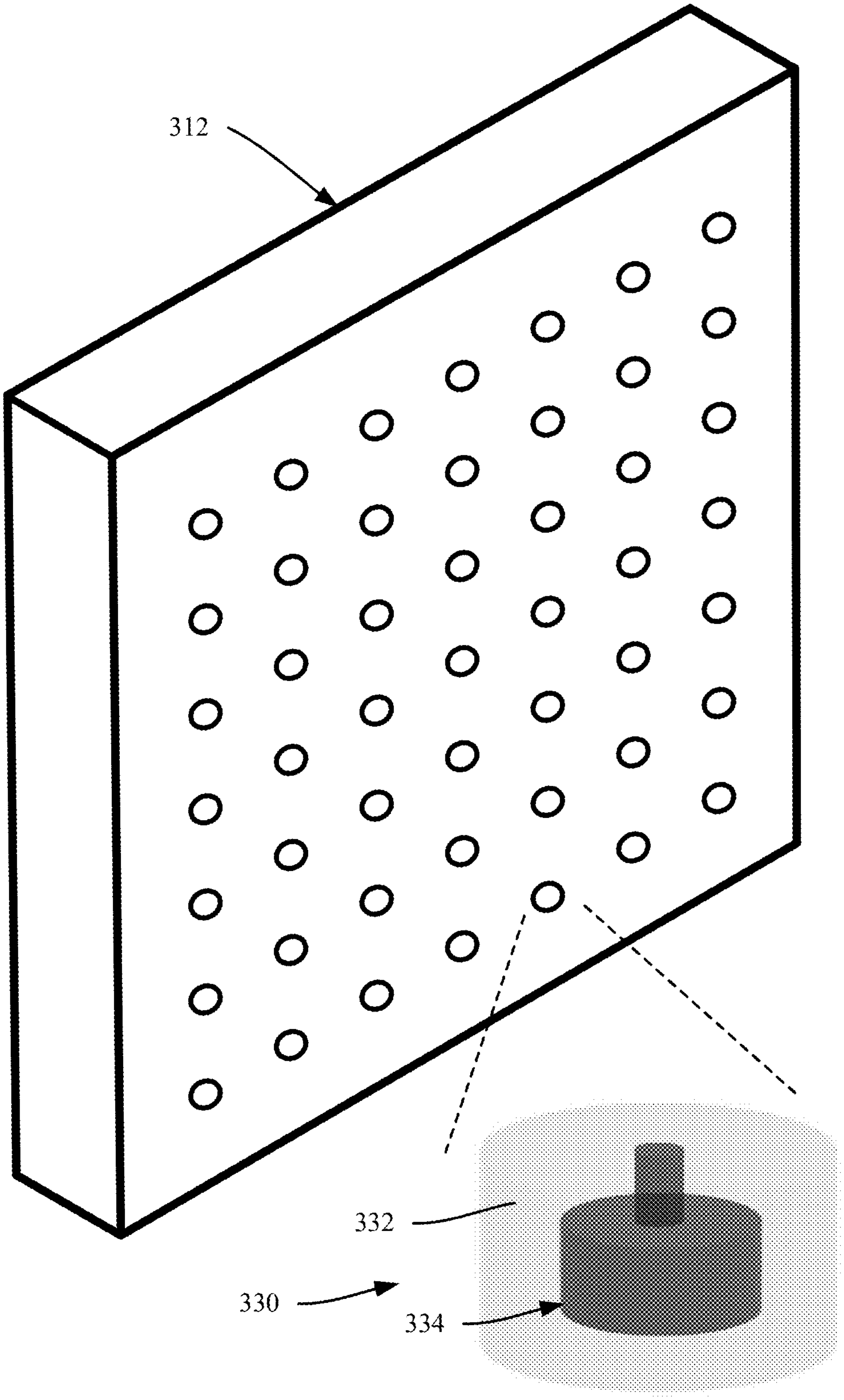
FIG. 3 is a three-dimensional representation of an example sound absorbing metasurface showing an enlarged view of an example unit cell, in accordance with various aspects and implementations of the subject disclosure.

The sound absorbing unit-cell can be fabricated using additive manufacturing technology with the features of material simplicity and deeply sub-wavelength compact design. An illustration of the example metasurface 312 with an arrayed distribution of unit-cells (one of which labeled 330 is enlarged) is shown in FIG. 3. One example of such metasurface with the geometry of the previous 1310 Hz frequency absorbing target is shown with a 4 cm thickness and a 40 cm by 40 cm width and length. Note that while a symmetrical array of periodically distributed unit cells is shown, this is only a non-limiting example. Further note that the entire metasurface can be 3D printed or can be manufactured using any typical additive manufacturing process, with selectively different materials for the unit cell supporting structure 226 compared to the remainder of the metasurface that houses the unit cells, including, for example, a high thermal conductivity material (such as aluminum nitrate) for at least part of the metasurface containing the arrangement of unit cells. In this way, the high thermal conductivity material better transfers the heat away from the server or the like for dissipation in the surrounding environment, e.g., the air of a room. If only the unit cell portions are 3D printed, the non-unit cell part of the metasurface can be machined to accept and contain the separately printed or otherwise constructed unit cells, e.g., one subsurface with openings appropriately-sized for the chamber dimensions, and another subsurface with openings appropriately-sized for the neck dimensions, which when joined form the metasurface.

The entire structure has a significantly reduced weight and material cost compared to the other sound absorbing alternatives. For example, the air cavity 332 in the unit-cell 330 as shown in FIG. 3 occupies about thirty-five percent of the space in the solid supporting structure 334. The 3D printing technology can use a uses grid structure for the solid part, with an average of about fifteen percent material usage using a common cross-grid structure. Combining these two factors, the designed example structure contains about 90.3 percent air, reducing overall weight and material usage.

Figure 4:
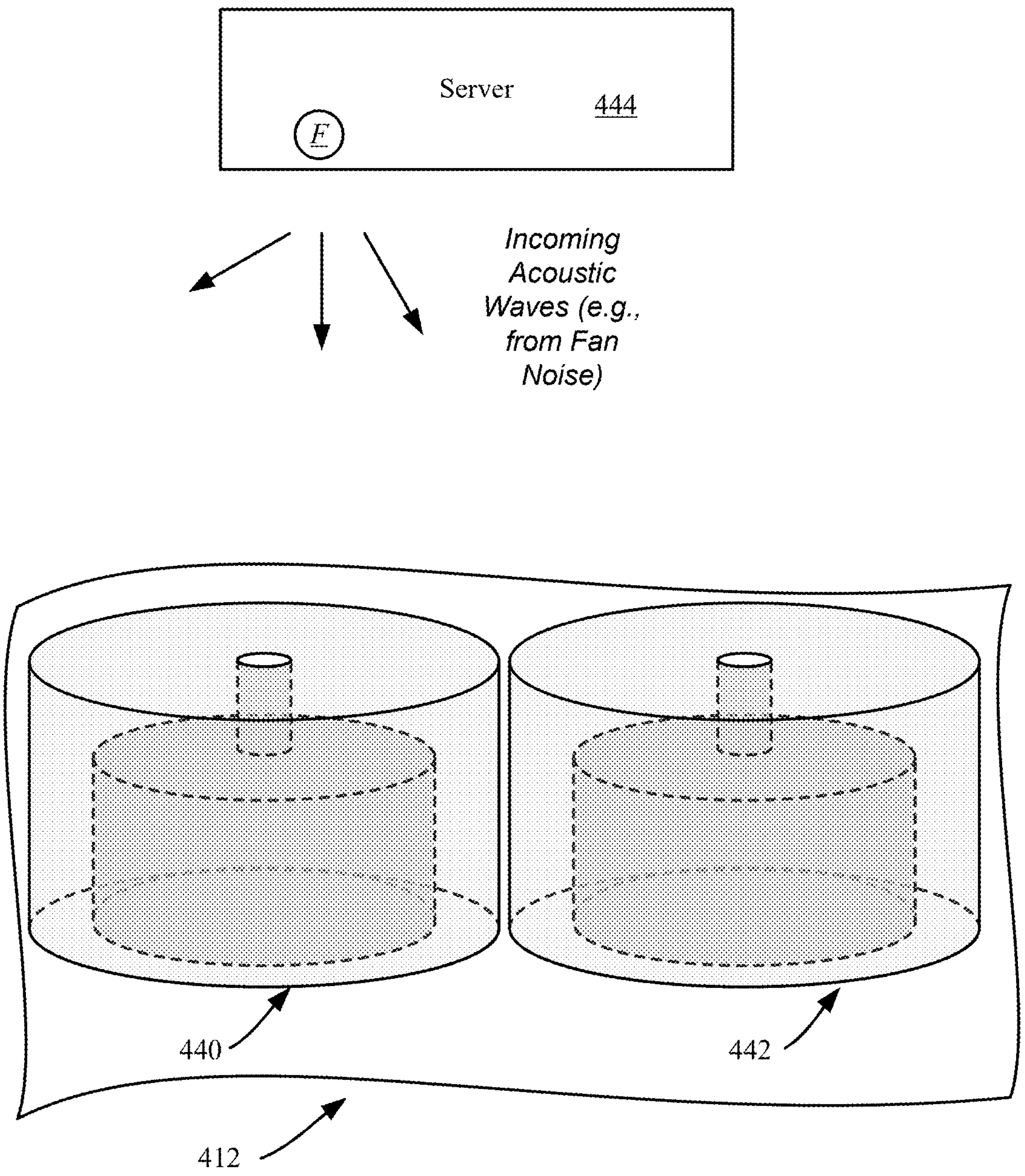
FIG. 4 is a representation of an example portion of a sound absorbing metasurface showing an enlarged view of two of the metasurface's adjacent unit cells positioned to phase cancel a narrowband frequency within incoming acoustic waves from a server, in accordance with various aspects and implementations of the subject disclosure.
Figure 5:
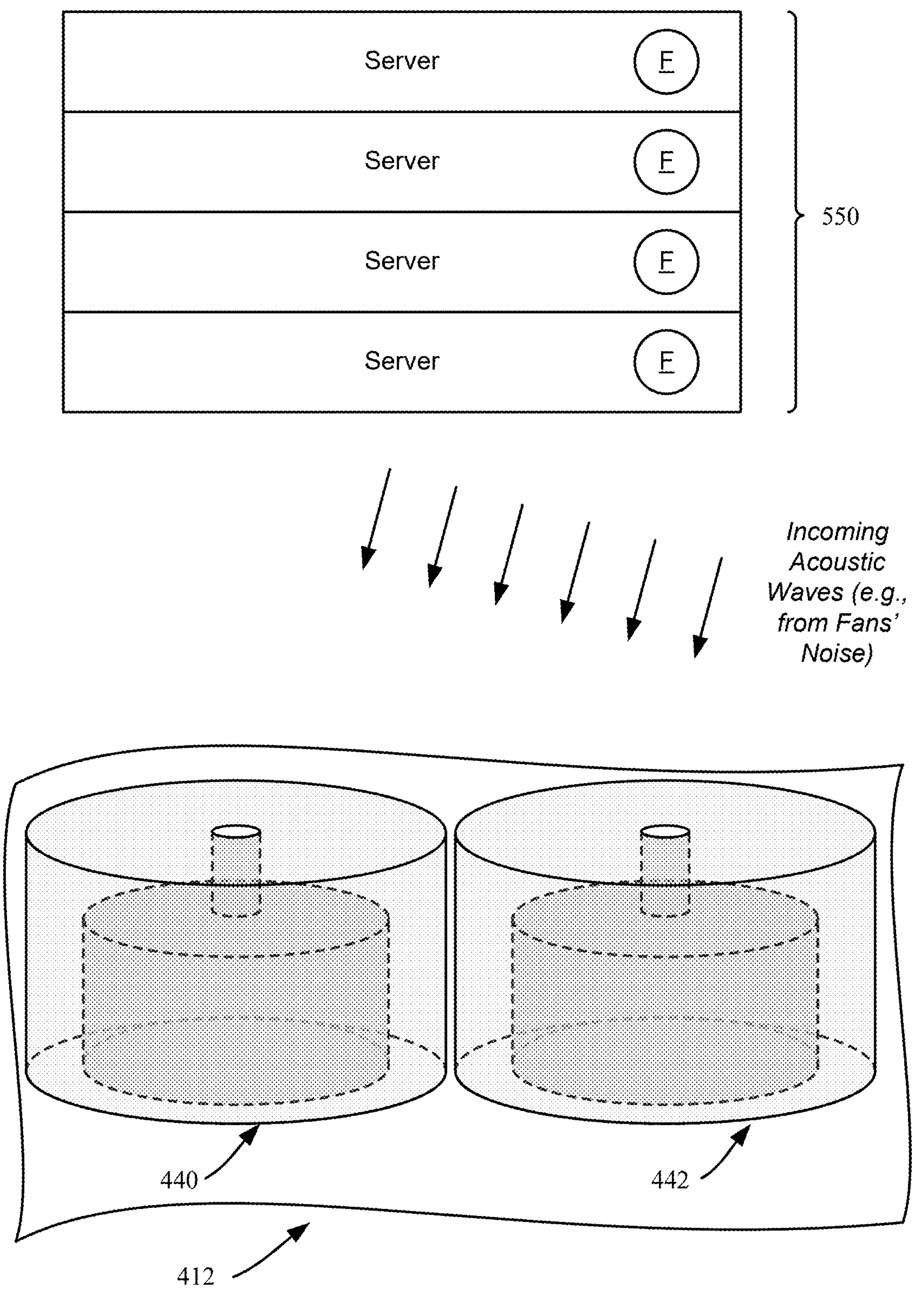
FIG. 5 is a representation of an example portion of a sound absorbing metasurface showing an enlarged view of two of the metasurface's adjacent unit cells positioned to phase cancel a narrowband frequency within incoming acoustic waves from a rack of servers, in accordance with various aspects and implementations of the subject disclosure.
Figure 6:
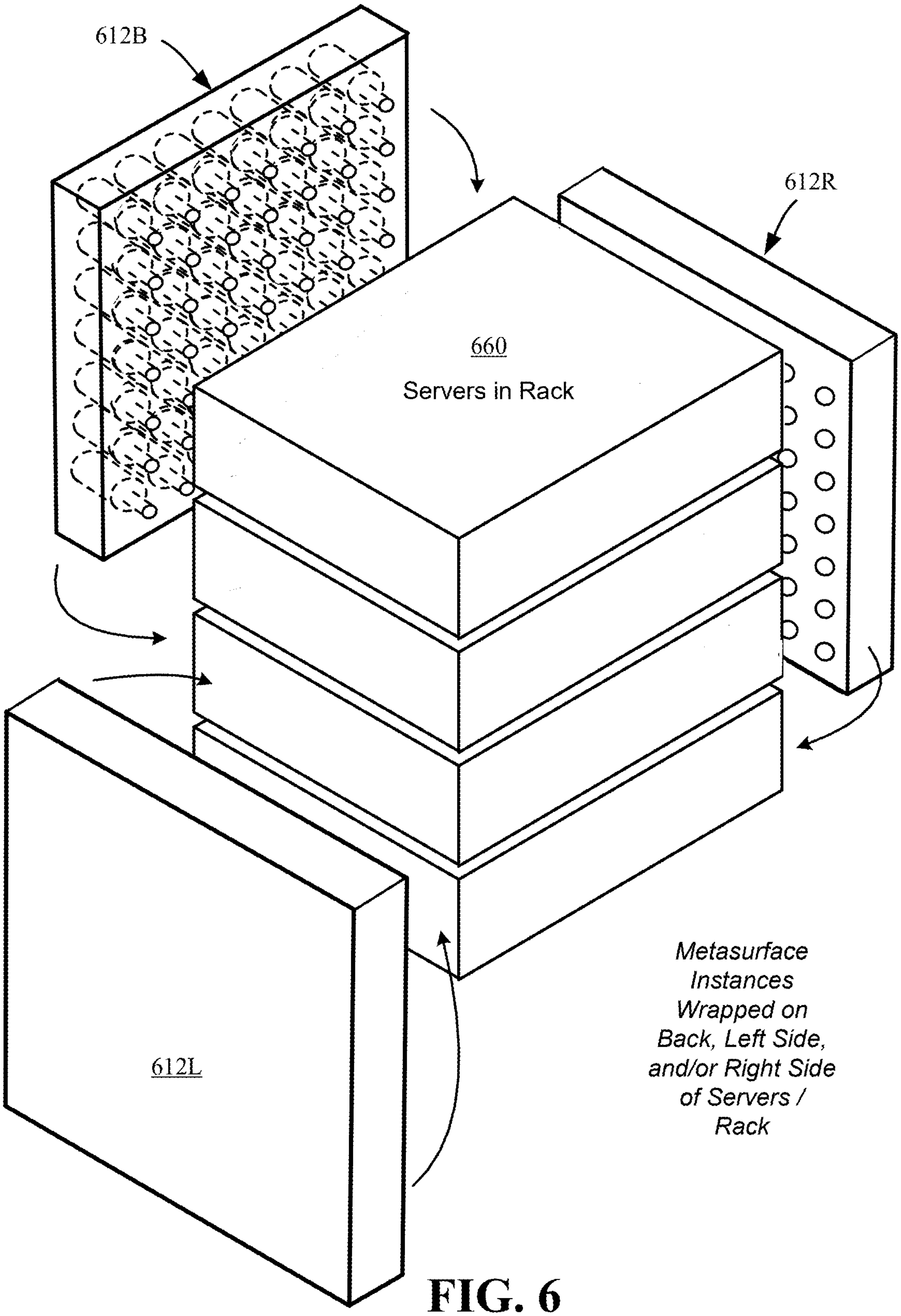
FIG. 6 is a three-dimensional, perspective representation of a sound absorbing metasurface composed of unit cells for wrapping around a rack of servers to reduce noise emanating from the servers, in accordance with various aspects and implementations of the subject disclosure.

FIG. 4 depicts an example usage scenario, in which a portion of a metasurface 412 is shown with two enlarged unit cells 440 and 442 positioned proximate a server 444 to absorb noise emanating from the server's fan F. Although not explicitly shown herein, a metasurface or multiple metasurfaces as described herein can be positioned as an absorber proximate a server (FIG. 4) or rack of servers 550 (FIG. 5), and/or wrapped around at least part of a server or rack of servers 660 (metasurfaces 612B, 612L and 612R) as depicted in FIG. 6.

Validation of single-frequency sound absorption via the above-described metasurface structure, which was designed to be effective within a narrowband frequency range, was proved experimentally. Note that the designed surface will primarily absorb sound at the specific frequency for which it is designed, even if incoming noise is broadband across a larger spectrum.

Figure 7A:
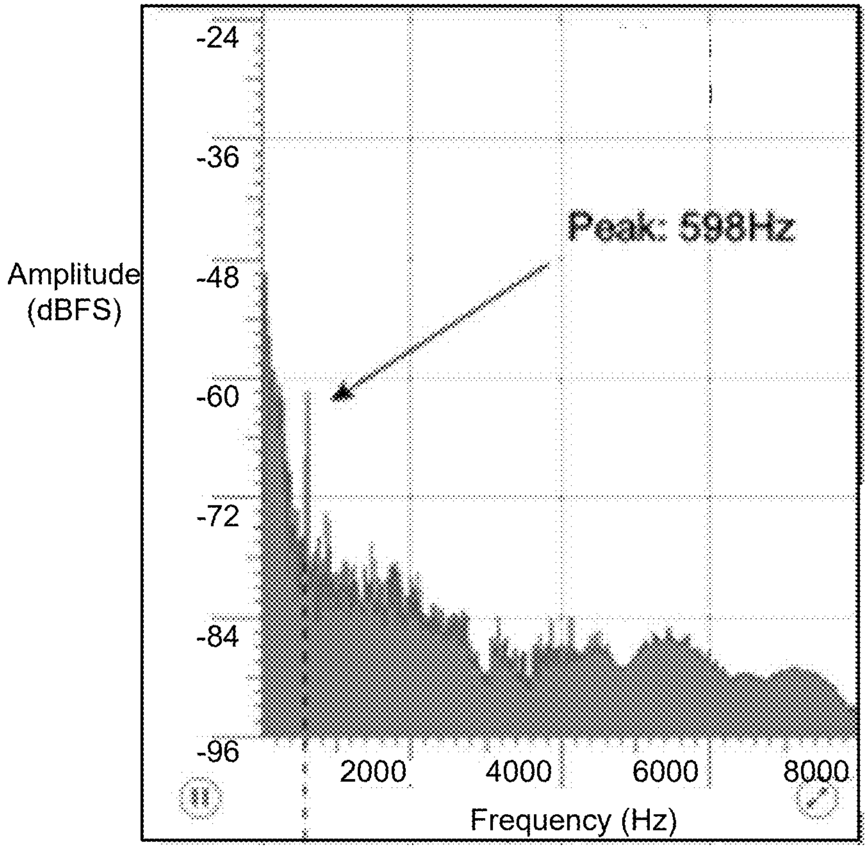
FIGS. 7A and 7B are graphical representations of an example measurement result of a sound spectrum emanating from a server measured inside the same room as the server, in accordance with various aspects and implementations of the subject disclosure.
Figure 7B:
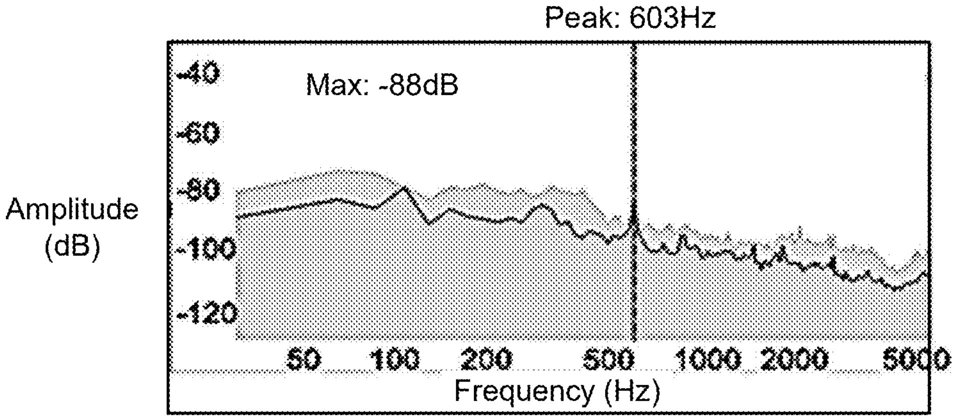
Figure 8A:
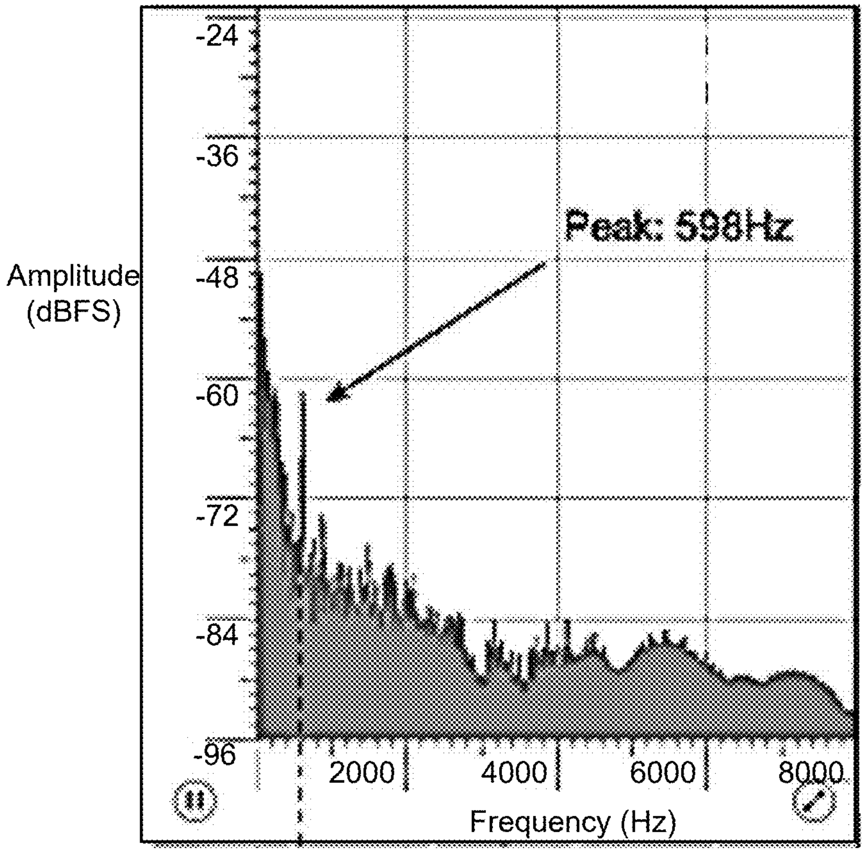
FIGS. 8A and 8B are graphical representations of an example measurement result of a sound spectrum emanating from a server measured from outside the server's room, in accordance with various aspects
Figure 8B:
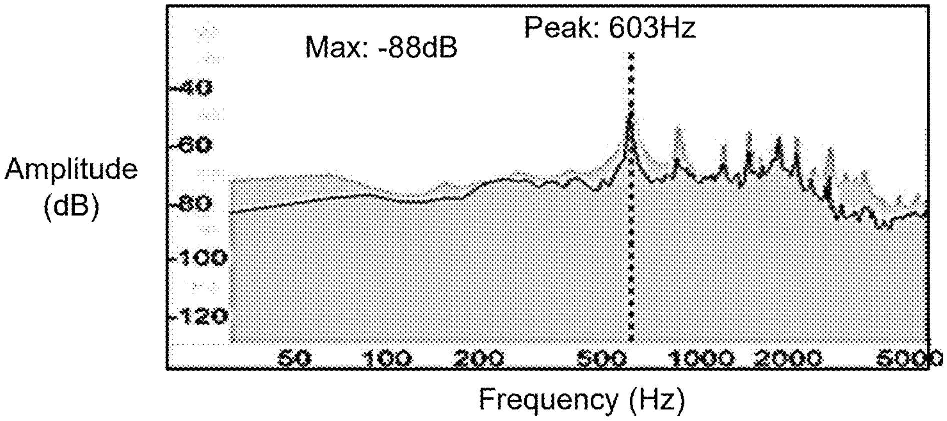

Measurements were performed using an actual server with a metasurface positioned proximate to the server within less than a one meter range, as somewhat represented in in FIG. 4. The results confirmed the bandwidth assumption, and are depicted in FIGS. 7A and 7B (measured within the same room as the server) and in FIGS. 8A and 8B (measured outside the room). Four different tests were conducted, involving two different measurement software tools and two distinct scenarios with the server. A slight difference of about 5 Hz in the noise frequency between the measurements was observed. This discrepancy can be attributed to measurement inaccuracies and the lower resolution bandwidth in one of the measurement software tools, as indicated by the more gradual change in amplitude (FIGS. 7B and 8B) compared to the amplitude curves of (FIGS. 7A and 8A). However, both measurements consistently identified a single significant (peak) noise frequency, supporting application of the proposed metasurface for effectively absorbing server-generated noise. Although the dimensions of some of the unit cells were designed for 1310 Hz absorption to reduce high pitch noise, it can be readily appreciated that alternative unit cells/metasurfaces can be designed as described herein for cancelling other measured peaks, such as 598 Hz-603 Hz in FIGS. 7A and 8A, and FIGS. 7B and 8B. As can be appreciated, noise cancellation of servers is very desirable, as the noise produced by a server in an adjacent room can be at minimum, 13 dB or higher than the ambient noise level in an office. This number, although, depends on the server fan and the compute processor used or simply the thermal requirements of the server.

One or more aspects can be embodied in a system, such as described and represented in the drawing figures herein. The system can include a unit cell of a metasurface configured for sound absorption within a narrowband frequency range, the unit cell having dimensions that are deep sub-wavelength values relative to a wavelength of an incoming acoustic wave that is within the narrowband frequency range. The unit cell can include an air cavity within a solid supporting structure, the air cavity comprising a chamber and a neck port, wherein the chamber has a first volume with a first width dimension, wherein the neck port has a second volume with a second width dimension that is narrower than the first width dimension, wherein the neck port extends through the solid supporting structure and is coupled to the chamber to expose the incoming acoustic wave to air in the chamber, and wherein the first volume and the second volume determine a resonant frequency of the unit cell to resonate the unit cell at the resonant frequency, to phase cancel the incoming acoustic wave, when exposed to the incoming acoustic wave.

The air cavity, neck port and solid supporting structure can form a Helmholtz resonator.

The chamber can be a cylinder dimensioned with the first width dimension and a first height dimension, and the first volume can be based on the first height dimension and a first circular area corresponding to the first width dimension.

The neck port can be a circular cylinder dimensioned with the second width dimension and a second height dimension, and the second volume can be based on the second height dimension and a second circular area corresponding to the second width dimension.

The first width dimension can be on the order of less than one-tenth of the wavelength of the incoming acoustic wave.

The unit cell can be incorporated into a metasurface comprising an array of unit cells. The metasurface can be positioned proximate to a server, and the incoming acoustic wave at the unit cell can result from operation of a cooling fan of the server. The metasurface can be positioned proximate a server comprising a cooling fan that acts as a noise source that emanates the incoming acoustic wave, with respective neck ports of respective unit cells of the array open towards the noise source. The metasurface can be positioned proximate to a rack of servers, and the incoming acoustic wave at the unit cell can result from operation of cooling fans of the servers. The metasurface can be wrapped around at least part of a server, and the incoming acoustic wave at the unit cell can result from operation of a cooling fan of the server. The metasurface can be wrapped around at least part of a rack of servers, and the incoming acoustic wave at the unit cell can result from operation of cooling fans of the servers.

The unit cell can be formed by a three-dimensional printer that prints the solid structure in layers in conjunction with omitting printing of the chamber and the neck port.

Figure 9:
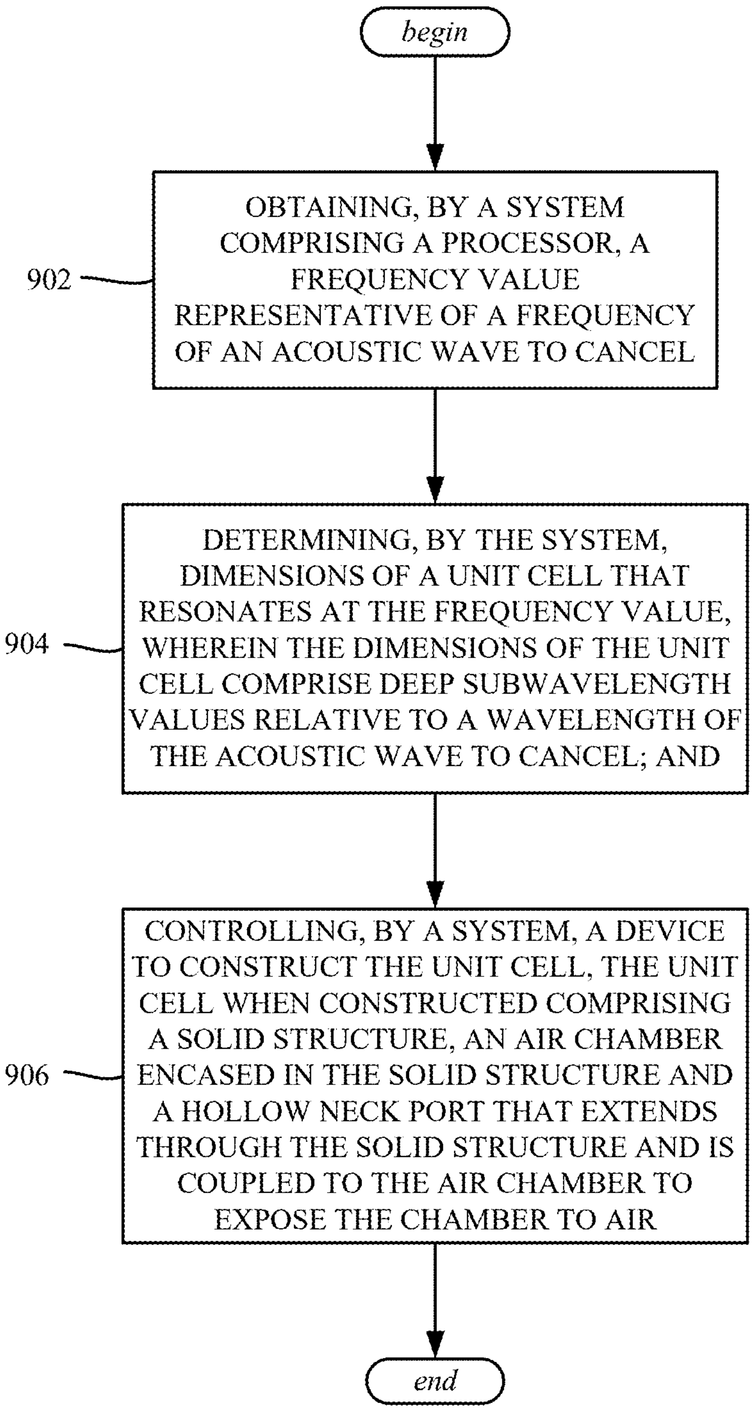
FIG. 9 is a flow diagram showing example operations related to determining dimensions of a unit cell to resonate at a given frequency value, and controlling a device to construct the unit cell, in accordance with various aspects and implementations of the subject disclosure.

One or more example aspects, such as corresponding to example operations of a method, are represented in FIG. 9. Example operation 902 represents obtaining, by a system comprising a processor, a frequency value representative of a frequency of an acoustic wave to cancel. Example operation 904 represents determining, by the system, dimensions of a unit cell that resonates at the frequency value, wherein the dimensions of the unit cell comprise deep subwavelength values relative to a wavelength of the acoustic wave to cancel. Example operation 906 represents controlling, by a system, a device to construct the unit cell, the unit cell when constructed comprising a solid structure, an air chamber encased in the solid structure and a hollow neck port that extends through the solid structure and is coupled to the air chamber to expose the chamber to air.

The neck port can be a right circular cylinder, and determining the dimensions of the unit cell can include determining a neck port height and a neck port radius.

The air chamber can be a right circular cylinder, and determining the dimensions of the unit cell can include determining a chamber height and a chamber radius.

Controlling the device to construct the unit cell can include communicating, by the system, with a three-dimensional printer.

One or more aspects can be embodied in a metasurface, such as described and represented in the drawing figures herein. The metasurface can include a base structure, and a group of respective unit cells contained by the base structure. The respective unit cells can include respective Helmholtz resonators comprising respective air chambers coupled to respective neck ports that extend to a surface of the base structure to facilitate air flow to the respective air chambers, the respective unit cells can be configured with respective deep subwavelength dimensions relative to wavelengths of incoming acoustic waves having a specific frequency value within a narrowband frequency range, and the deep subwavelength dimensions can be selected to resonate the respective unit cells at the specific frequency value to collectively phase cancel the incoming acoustic waves when exposed to the incoming acoustic waves.

The respective unit cells can be evenly distributed in an array pattern within the base structure. The respective unit cells can include respective cylindrical neck ports and respective cylindrical air chambers.

The metasurface can be configured to collectively phase cancel the incoming acoustic waves emanating from at least one server.

The base structure can include a high thermal conductivity material to facilitate conduction of heat from the at least one server to a medium external to the at least one server.

As can be seen, the technology described herein facilitates construction and deployment of a metasurface of unit cells, which can be implemented in a practical, compact and lightweight surface configuration. As one example, the metasurface is highly useful in the context of mitigating server noise. One unit-cell design achieved high sound absorption (greater than 98 percent) of an incoming sound wave at the frequency for which it was designed. Based on the technology described herein, thin, light-weight, and cost effective sound absorbers can be constructed, including by using additive manufacturing technology.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

a unit cell of a metasurface configured for sound absorption within a narrowband frequency range corresponding to a peak frequency of noise generated by a cooling fan of at least one server, the unit cell having dimensions that are deep subwavelength values relative to a wavelength of an incoming acoustic wave that is within the narrowband frequency range, the unit cell comprising:

an air cavity within a solid supporting structure, the air cavity comprising a chamber and a neck port, wherein the chamber has a first volume with a first width dimension, wherein the neck port has a second volume with a second width dimension that is narrower than the first width dimension, wherein the neck port extends through the solid supporting structure and is coupled to the chamber to expose the incoming acoustic wave to air in the chamber, and wherein the first volume and the second volume determine a resonant frequency of the unit cell to resonate the unit cell at the resonant frequency such that the unit cell produces a reflected wave with approximately a $\pi$ phase shift relative to the incoming acoustic wave at the resonant frequency, to phase cancel the incoming acoustic wave, when exposed to the incoming acoustic wave.

2. The system of claim 1, wherein the air cavity, the neck port, and the solid supporting structure form a Helmholtz resonator.

3. The system of claim 1, wherein the chamber is a cylinder dimensioned with the first width dimension and a first height dimension, and wherein the first volume is based on the first height dimension and a first circular area corresponding to the first width dimension.

4. The system of claim 3, wherein the neck port is a circular cylinder dimensioned with the second width dimension and a second height dimension, and wherein the second volume is based on the second height dimension and a second circular area corresponding to the second width dimension.

5. The system of claim 1, wherein the first width dimension is less than one-tenth of the wavelength of the incoming acoustic wave.

6. The system of claim 1, wherein the metasurface comprises an array of unit cells.

7. The system of claim 6, wherein the metasurface is positioned proximate to a server comprising a cooling fan that acts as a noise source that emanates the incoming acoustic wave, with respective neck ports of respective unit cells of the array oriented toward and open towards the noise source.

8. The system of claim 6, wherein the metasurface is positioned proximate to a rack of servers, and wherein the incoming acoustic wave at the unit cell results from operation of cooling fans of the servers, and the metasurface is positioned within less than one meter of the rack of servers.

9. The system of claim 6, wherein the metasurface is wrapped around at least part of a server, and wherein the incoming acoustic wave at the unit cell results from operation of a cooling fan of the server, and wherein the metasurface conforms to at least two adjacent exterior sides of a housing of the server.

10. The system of claim 6, wherein the metasurface is wrapped around at least part of a rack of servers, and wherein the incoming acoustic wave at the unit cell results from operation of cooling fans of the servers.

11. The system of claim 1, wherein the unit cell is formed by a three-dimensional printer that prints the solid supporting structure in layers as a single piece in conjunction with omitting printing of the chamber and the neck port.

12. A method, comprising:

obtaining, by a system comprising a processor, a frequency value representative of a frequency of an acoustic wave to cancel, the frequency value obtained using a peak frequency detector configured to measure a dominant narrowband peak in noise generated by a cooling fan of at least one server;

determining, by the system, dimensions of a unit cell that resonates at the frequency value, wherein the dimensions of the unit cell comprise deep subwavelength values relative to a wavelength of the acoustic wave to cancel, the determining comprising executing frequency-to-resonator parameter logic implemented by the processor to compute a chamber volume and a neck port geometry of the unit cell based on the frequency value; and controlling, by the system, a device to construct the unit cell, the unit cell when constructed comprising a solid structure, an air chamber encased in the solid structure and a hollow neck port that extends through the solid structure and is coupled to the air chamber to expose the air chamber to air.

13. The method of claim 12, wherein the hollow neck port is a right circular cylinder, and wherein the determining of the dimensions of the unit cell comprises determining a neck port height and a neck port radius as part of the frequency-to-resonator parameter logic.

14. The method of claim 12, wherein the air chamber is a right circular cylinder, and wherein the determining of the dimensions of the unit cell comprises determining a chamber height and a chamber radius as part of the frequency-to-resonator parameter logic.

15. The method of claim 12, wherein the controlling of the device to construct the unit cell comprises communicating, by the system, with a three-dimensional printer.

16. A metasurface, comprising:

a base structure; and a group of respective unit cells contained by the base structure, wherein the respective unit cells comprise respective Helmholtz resonators comprising respective air chambers coupled to respective neck ports that extend to a surface of the base structure to facilitate air flow to the respective air chambers, wherein the respective unit cells are configured with respective deep subwavelength dimensions relative to wavelengths of incoming acoustic waves having a specific frequency value within a narrowband frequency range corresponding to a measured peak noise frequency generated by a cooling fan of at least one server, and wherein the deep subwavelength dimensions are selected to resonate the respective unit cells at the specific frequency value to collectively phase cancel the incoming acoustic waves when exposed to the incoming acoustic waves emanating from the at least one server.

17. The metasurface of claim 16, wherein the respective unit cells are evenly distributed in an array pattern within the base structure.

18. The metasurface of claim 16, wherein the respective unit cells comprise respective cylindrical neck ports and respective cylindrical air chambers.

19. The metasurface of claim 16, wherein the metasurface is configured to collectively phase cancel the incoming acoustic waves emanating from the at least one server when the metasurface is positioned proximate to the at least one server.

20. The metasurface of claim 19, wherein the base structure comprises a high thermal conductivity material comprising at least one of a high thermal conductivity ceramic or composite material including aluminum nitride to facilitate conduction of heat from the at least one server to a medium external to the at least one server.

* * * * *